United States Patent
Kerler et al.

(10) Patent No.: US 6,864,072 B2
(45) Date of Patent: Mar. 8, 2005

(54) METHOD FOR THE ENZYMATICAL PREPARATION OF FLAVORS RICH IN C6-C10 ALDEHYDES

(75) Inventors: Josef Kerler, Naarden (NL); Eric Kohlen, Leusden (NL); Amy Van Der Vliet, Harmelen (NL); Wolfgang Fitz, Amsterdam (NL); Chris Winkel, Bussum (NL)

(73) Assignee: Quest International B.V., Naarden (NL)

( * ) Notice: Subject to any disclaimer, the term of this patent is extended or adjusted under 35 U.S.C. 154(b) by 85 days.

(21) Appl. No.: 10/148,467

(22) PCT Filed: Dec. 4, 2000

(86) PCT No.: PCT/NL00/00890

§ 371 (c)(1),
(2), (4) Date: Oct. 9, 2002

(87) PCT Pub. No.: WO01/39614

PCT Pub. Date: Jun. 7, 2001

(65) Prior Publication Data

US 2004/0214299 A1 Oct. 28, 2004

(30) Foreign Application Priority Data

Dec. 2, 1999 (EP) ............................................. 99204091

(51) Int. Cl.$^7$ .............................. C12P 7/64; C12P 7/24
(52) U.S. Cl. .......................... 435/135; 426/33; 435/147
(58) Field of Search ............................ 426/33; 435/134, 435/147

(56) References Cited

U.S. PATENT DOCUMENTS 5,464,761 A 11/1995 Muller et al.
5,705,372 A 1/1998 Belin et al.

FOREIGN PATENT DOCUMENTS

EP 0 911 414 A1 4/1999

OTHER PUBLICATIONS

Sekiya et al., "Volatile C4–Aldehyde Formation Via Hydroperoxides From C–18–Unsaturated Fatty Acids in Etiolated Alfalfa and Cucumber Seedlings," Chemical Abstracts + Indexes, U.S. American Chemical Society, Columbus, Abstract 189842u, vol. 23, No. 91 (Dec. 3, 1979).

Eisenbrand et al., "Römpp Lexikon der Lebensmittelchemie," 1995, Georg Thieme Verlag, Stuttgart, New York, XP 002141589, p. 503.

*Primary Examiner*—Herbert J. Lilling
(74) *Attorney, Agent, or Firm*—Fitch, Even, Tabin & Flannery

(57) ABSTRACT

The invention relates to a method for the preparation of flavors with for instance creamy, green, cucumber like fatty odour characteristics by reacting an oil or fat comprising unsaturated fatty acid triglycerides with a lipoxygenase preparation capable of converting triglycerides into their hydroperoxides in a multiphase system in the presence of air, air enriched with oxygen or oxygen and, subsequently thermally converting the obtained mixture—preferably under acidic conditions—resulting in an aldehyde containing product. Further the invention encompasses the use of the obtained flavors for incorporation in all kinds of food products like dairy products such as ice-cream, yoghurt and skim milk and savory products as well as the produced flavoured products.

15 Claims, 2 Drawing Sheets

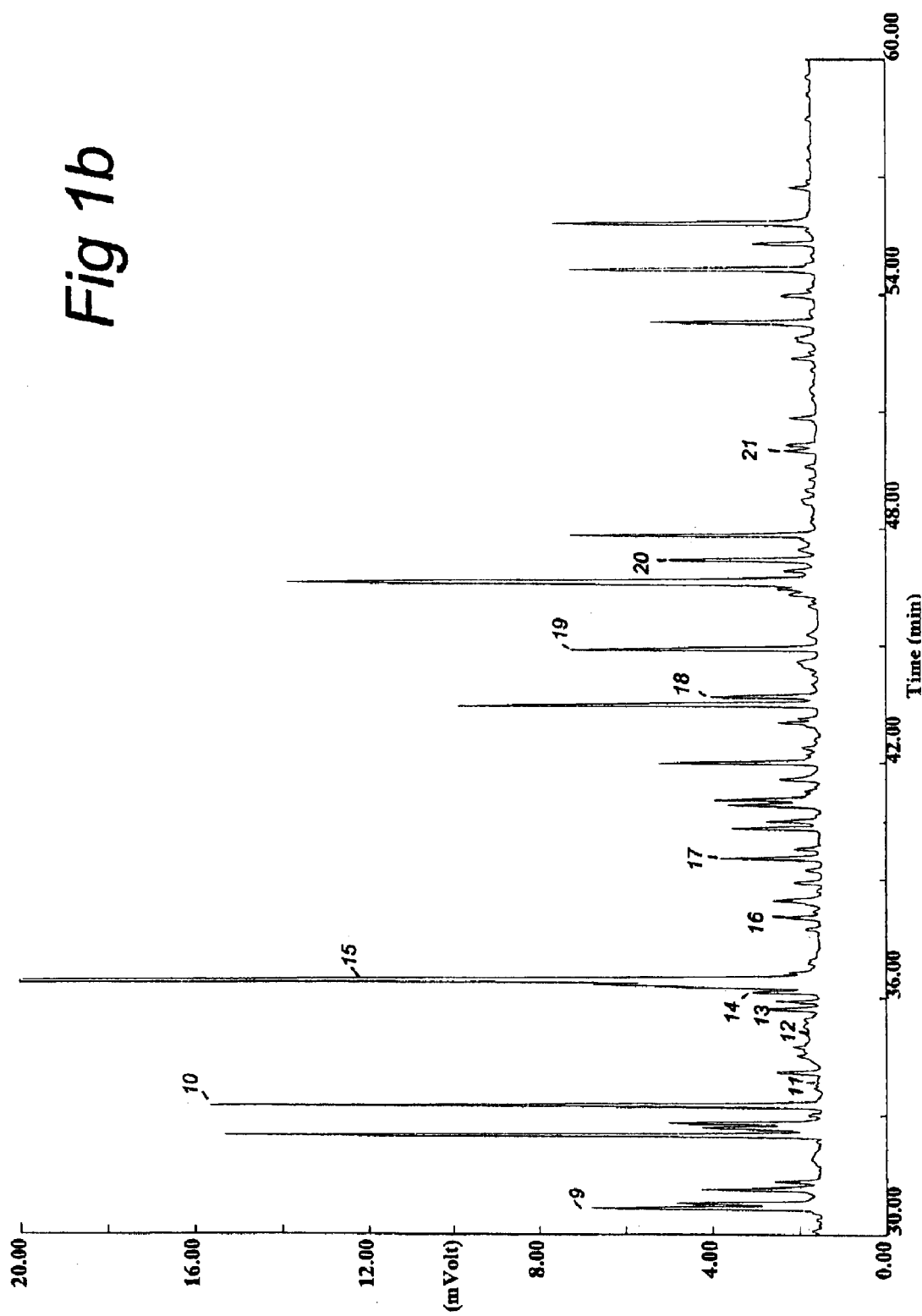

METHOD FOR THE ENZYMATICAL PREPARATION OF FLAVORS RICH IN C6-C10 ALDEHYDES

CROSS-REFERENCED APPLICATIONS

Figure 1A:
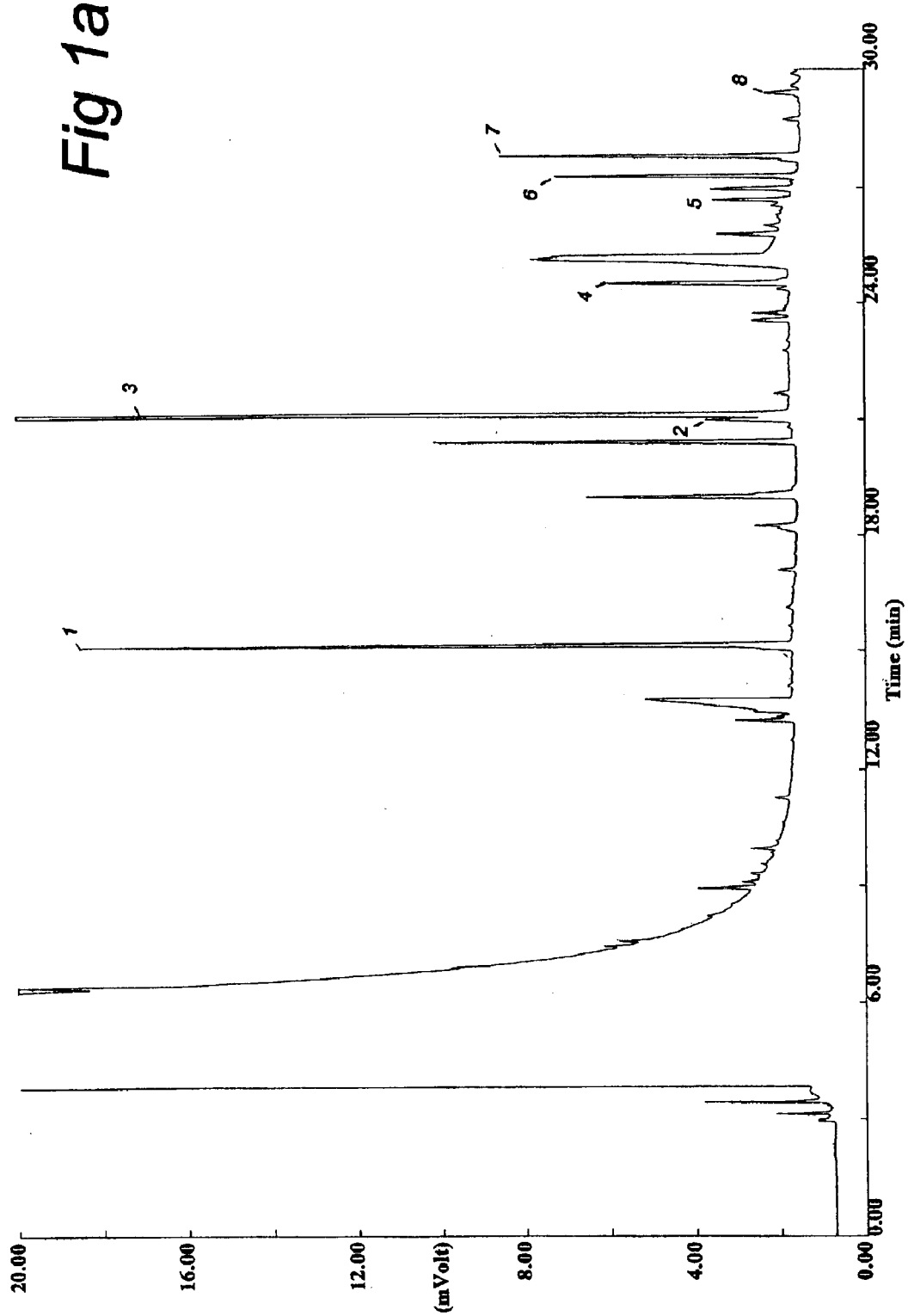

This application is a National phase of International Application PCT/NL00/00890, filed Dec. 4, 2000, which designated the U.S. and that International Application was published under PCT Article 21(2) in English.

The invention relates to a method for the enzymatical preparation of flavours, particularly flavours rich in $C_6$–$C_{10}$ aldehydes.

The enzymatical preparation of flavours like green aromas represented by the compounds cis-3-hexen-1-ol and trans-2-hexenal and related compounds like trans-2-hexenal, 1-hexanal etc. is known from WO 95/26413. More in particular green note compounds are prepared by subjecting linolenic acid (purified linolenic acid or lipase treated linseed oil) and a fresh plant material like watermelon foliage to shearing in the presence of an aqueous liquid and yeast. Enzymes within the plant material, i.e. lipoxygenase and hydroperoxide-lyase and an enzyme within the yeast, i.e. alcohol dehydrogenase act to cause the linolenic acid to be converted to the green note compounds.

U.S. Pat. No. 4,769,243 A discloses a method for the preparation of green aroma compounds which comprises grinding raw soybeans in the presence of water at a temperature of 60° C. or less, adding to said ground soybeans unsaturated fatty acids or a mixture of lipase and a triglyceride, resulting in free fatty acids, and stirring the obtained mixture at a temperature of 5° C. to 60° C., preferably 25° C. to 50° C., while supplying air or oxygen to said mixture to produce said green aromas.

WO 94/08028 relates to a method for enzymatically preparing aromas, particularly $C_6$–$C_{10}$ aldehydes by contacting at least one source of lipoxygenase and hydroperoxyde-lyase e.g. soy flour, with a source of unsaturated fatty acids (purified unsaturated fatty acids or a lipase treated fat or oil) under agitation conditions in the presence of oxygen in a multiphase medium comprising at least one solid phase one oily phase and optionally an aqueous phase. Further alcohol dehydrogenase can be applied for converting the obtained aldehydes to the corresponding alcohols.

Further WO 93/24644 discloses a method for the preparation of n-hexanal, 3-(Z)-hexen-1-al or 2-(E)-hexen-1-al, as well as the corresponding alcohols by subjecting linoleic or linolenic acid (purified linoleic or linolenic acid or a lipase treated or alkali treated oil) to lipoxygenase activity, converting the obtained hydroperoxy compounds into the aldehydes n-hexanal and 3-(Z)-hexen-1-al and either reducing the aldehydes by means of a yeast (i.c. alcohol dehydrogenase) into n-hexanol and 3-(Z)-hexen-1-ol or isomerising 3-(Z)-hexen-1-al into 2-(E)-hexen-1-al and reducing this compound by means of a yeast into 2-(E)-hexen-1-ol.

As apparent from the above-cited prior art the starting material for the enzymatic reaction by means of lipoxygenase and subsequently other enzymes like hydroperoxyde-lyase and alcohol dehydrogenase is either the refined or purified unsaturated fatty acids as such or oils and fats comprising unsaturated fatty acids subjected to hydrolysis by means of an alkali or a linase treatment resulting in a hydrolysed product containing the released unsaturated fatty acids and a number of byproducts. This last method is not suitable for several interesting oils and fats like butter oil and butter fat, as during the hydrolysation of said oils and fats undesirable flavouring components like butyric acid are released which will ruin the intended flavours.

In view of the above Applicant has searched for a method for preparing interesting flavours without the above-defined disadvantages bound to the prior art methods.

Surprisingly it has been found that flavours could be directly prepared from oils and fats without the need of hydrolysis thereof by means of an alkali or a lipase treatment.

More in particular the invention relates to a method for the preparation of flavours with for instance creamy, green, cucumber like fatty odour characteristics which are rich in $C_6$–$C_{10}$ aldehydes by performing the following steps:

a) reacting an oil or fat comprising unsaturated fatty acid triglycerides with a lipoxygenase preparation capable of converting triglycerides into their hydroperoxides in a multiphase system in the presence of air, air enriched with oxygen or oxygen and b) subsequently thermally converting the obtained mixture—preferably under acidic conditions—in an aldehyde containing product.

In a preferred embodiment of the invention the reaction between the oil or fat comprising the unsaturated fatty acids on the one hand and the lipoxygenase preparation (E.C. 1.13.11.12) on the other hand (step a)) is carried out at a pH in the range of 5 to 8, most preferably about 7. In this respect it is brought to the fore that the lipoxygenase responsible for the conversion of the unsaturated fatty acid moieties of the oil or fat into their corresponding hydroperoxide compounds is a type-2-lipoxygenase having an optimum pH of 6.8. Sources of type-2 lipoxygenase are soy flour, pea flour, barley flour wheat flour and maize flour. Preferably substantially lipase free soy flour is used as the type-2 lipoxygenase source. Further possible to use an aqueous extract of any of the flours indicated above.

In principle, all kinds of oils and fats comprising unsaturated fatty acids are applicable for the method according to the invention. Examples thereof are dairy oils and fats like butter oil and butter fat animal oils and fats like chicken fat and beef fat, vegetable oils like linseed oil and sunflower oil, as well as fats ex. fruit seeds like orange seeds.

After the formation of the hydroperoxide compounds in step a) of the method according to the invention these compounds are subsequently heated in the range of advantageously 90 to 180° C. Preferably, the heating step is carried out under acidic conditions for promoting a Hock cleavage of the hydroperoxides, resulting in aldehydes, in particular $C_7$–$C_9$ unsaturated aldehydes like (Z)-4-heptenal, (E)-2-nonenal, and (E,Z)-2,6-nonadienal. The formed aldehydes are preferably simultaneously extracted from the reaction mixture by using an extraction solvent or solvents e.g. diethylether/hexan (90:10, v/v). Such an extraction can be performed in a simultaneous manner in a Likens-Nickerson apparatus. The obtained aldehyde mixture dissolved in the extraction solvent can be separated therefrom in a way known per se, for instance by reduced vacuum distillation.

Finally, the invention relates to the use of the aldehydes obtained according to the method of the invention as flavour ingredients in all kind of food products, in particular in dairy products such as ice cream, yoghurt and skim milk and in savoury products.

The invention is elucidated by the following examples.
FIGS. 1a and 1b, show the chromatogram of the obtained aldehyde products according to Example 1.

EXAMPLE 1
Enzymatic Oxidation of Butter Oil

Butter oil (250 g) with enriched concentrations of unsaturated fatty acid triglycerides (oleic acid 45.7%. linoleic acid 2.5%, linolenic acid 1.3%) was reacted with soy flour (2.25 g), diluted in 30 g phosphate buffer (50 mM) at pH 7, with stirring at about 1000 rpm for 24 hours while supplying air at a rate of 2500 ml/min. The reaction mixture exhibited only a weak, odour. Citric acid (50 g) dissolved in water (250 g) was added to the obtained reaction mixture and subjected to a simultaneously distillation extraction procedure using a Likens-Nickerson apparatus. The distillation was carried out at 100° C. for 6 hours and a mixture of diethyl ether/hexane (90:10 v/v) was used as extraction solvent. The organic solvent of the thus obtained aldehyde mixture was removed at 40° C. under vacuum (250 mbar) and the aldehyde block was dissolved in 2 ml ethanol. The product was analysed by GC/sniff/MS. The formed aldehydes are enumerated in Table 1 and shown in FIG. 1 (a+b) (chromatogram).

More in particular, for analysis, the product was dissolved in pentane (10% solution, v/v). 1 µl of this solution was injected on a HP-5 column (50 m×0.32 mm Ø×1 µm film), and analysed by GC/sniff/MS using the following conditions:

temperature program: 40° C.–3° C./min.–270° C.; gas velocity: 100 kpa;

MS apparatus parameter: Thermoquest, type voyager, EI mode, 70 eV.

Quantitative analysis was performed by GC/Fid using octanal as external standard.

TABLE I

| Nrs. mentioned in FIG. 1a and FIG. 1b | COMPOUND | mg/L |
|---|---|---|
| 1 | Hexanal | 487 |
| 2 | 4-heptenal (Z) | 62 |
| 3 | Heptanal | 1050 |
| 4 | 2-Heptanal (E) | 124 |
| 5 | 2,4-Heptadienal (E,Z) | 60 |
| 6 | Octanal | 177 |
| 7 | 2,4-Heptadienal (E,E) | 208 |
| 8 | 2-Octenal (Z) | 24 |
| 9 | 2-Octenal (E) | 165 |
| 10 | Nonanal | 460 |
| 11 | 2,4-octadienal (E,E) | <10 |
| 12 | 2-nonenal (Z) | <10 |
| 13 | 2,6-nonadienal (E,E) | <10 |
| 14 | 2,6-nonadienal (E,Z) | <10 |
| 15 | 2-nonenal (E) | 1001 |
| 16 | 2,4-nonadienal (E,Z) | <10 |
| 17 | 2,4-nonadienal (E,E) | 72 |
| 18 | 2,4-decadienal (E,Z) | 88 |
| 19 | 2,4-decadienal (E,E) | 202 |
| 20 | 2-undecenal (E) | 114 |
| 21 | 2,4-undecadienal (E) | <10 |

EXAMPLE 2

Enzymatic Oxidation of Citrus Oil

Citrus oil obtained from citrus seeds (250 g) was reacted with soy flour (7.75 g), diluted in a sodium borate buffer (90 g) at pH 8 and 25° C. The mixture was stirred vigorously for 15 hours while air was supplied at a rate of 500 ml/min. Then citric acid (250 g, 20% solution in water) was added and the aldehydes were isolated by a Likens-Nickerson distillation at 100° C. during 8 hours, using ether/hexane as extraction solvent. The ether was evaporated and the aldehydes were dissolved in ethanol (2 ml). This block can be applied in flavours for soft drinks.

The concentrations of the key aroma compounds are as follows:

| | ppm |
|---|---|
| 3-hexenal (z) | 125 |
| hexanal | 16250 |
| 2-hexenal (e) | 388 |
| heptanal | 238 |
| octanal | 13 |
| 4-heptenal (z) | 6 |
| 2,4-heptadienal (e,e) | 1025 |
| 2-octenal | 1125 |
| nonanal | 550 |
| 2,6-nonadienal (e,z) | 125 |
| 2-nonenal (e) | 3750 |
| 2,4-nonadienal (e,e) | 263 |
| 2,4-decadienal (e,e) | 1250 |

EXAMPLE 3

Enzymatic Oxidation of Linseed Oil

Linseed oil (250 g) was reacted at 25° C. with soy flour (7.75 g) diluted in a phosphate buffer (90 g, 50 mM) at pH 7. The mixture was stirred vigorously for 15 hours while air was supplied at a rate of 500 ml/min. Then citric acid (250 g, 20% solution in water) was added and the mixture was steam distillated for another 15 hours, while supplying water to the heated water/oil mixture in the same amount as is distilled off. The distillate was extracted with hexane, the solvent was evaporated and the aldehyde block was dissolved in ethanol (2 ml). This aldehyde block can be applied in flavours for salad dressings and white sauces.

The concentrations of the key aroma compounds are as follows:

| | ppm |
|---|---|
| 3-hexenal (z) | 10380 |
| hexanal | 17340 |
| 2-hexenal (e) | 20150 |
| 2-heptenal (e) | 528 |
| 2,4-heptadienal (e,e) | 4930 |
| 2-octenal | 82 |
| nonanal | 3300 |
| 2,4-octadienal (e,e) | 2100 |
| 2,6-nonadienal (e,e) | 593 |
| 2,6-nonadienal (e,z) | 8900 |
| 2-nonenal (e) | 5350 |
| 2,4-nonadienal (e,e) | 95 |
| 2,4-decadienal (e,z) | 14 |
| 2,4-decadienal (e,e) | 885 |

EXAMPLE 4

Enzymatic Oxidation of Sunflower Oil

Sunflower oil (250g) was reacted with soy flour at 25° C., diluted in a sodium borate buffer (90 g) at pH 9 and 25° C. The mixture was stirred vigorously for 15 hours while air was supplied at a rate of 500 ml/min. Then citric acid (250 g. 20% solution in water) was added and the aldehydes were isolated by a Likens-Nickerson distillation at 100° C. during 8 hours, using ether/hexane as the extraction solvent. The organic solvent was evaporated and the aldehydes were dissolved in ethanol (2 ml). The aldehyde block can be applied in flavour for fried snacks.

The concentrations of the key aroma compounds are as follows:

| | ppm |
|---|---|
| 3-hexenal (z) | 125 |
| hexanal | 5250 |
| 2-hexenal (e) | 14 |
| heptanal | 150 |
| octanal | 13 |
| 4-heptenal (z) | 6 |
| 2,4-heptadienal (e,e) | 116 |
| 2-octenal (e) | 1375 |
| nonanal | 138 |
| 2,6-nonadienal (e,z) | 13 |
| 2-nonenal (e) | 263 |
| 2,4-nonadienal (e,e) | 375 |
| 2,4-decadienal (e,e) | 3375 |

What is claimed is:

1. A method for the preparation of flavours which are rich in $C_6$–$C_{10}$ aldehydes performing the following steps:
 (a) reacting an oil or fat comprising unsaturated fatty acid triglycerides, wherein said oil and said fat are not hydrolyzed, with a lipoxygenase preparation capable of converting triglycerides into their hydroperoxides in a multiphase system in the presence of air, air enriched with oxygen or oxygen; and
 (b) subsequently thermally converting the obtained mixture, optionally under acidic conditions, resulting in an aldehyde containing product.

2. The method according to claim 1, wherein soy flour, pea flour, barley flour, wheat flour or maize flour is used as the lipoxygenase preparation.

3. The method according to claim 1, wherein an aqueous extract of soy flour, pea flour, barley flour, wheat flour or maize flour is used as the lipoxygenase preparation.

4. The method according to any of claims 1–3, wherein the reaction step (a) is carried out at a pH in the range of 5 to 8.

5. The method according to claim 1, wherein the reaction step (a) is carried out at a pH of about 7.

6. The method according to claim 1, wherein the oil or fat is selected from the group consisting of dairy oils and fats, animals oil and fats, vegetable oils and fats.

7. The method according to any of claims 1–3, wherein step (b) is carried out as a combined heating and distillation step.

8. The method according to claim 7, wherein step (b) is carried out at a temperature in the range of 90 to 180° C.

9. The method according to claim 1, wherein step (b) is carried out under acidic conditions in the pH range of 3–7.

10. The method according to claim 1, wherein step (b) is carried out in the presence of any organic food grade acid.

11. The method according to claim 1, wherein step (b) is conducted under acidic conditions.

12. The method according to claim 1, wherein said soy flour is lipase-free soy flour.

13. The method according to claim 7, wherein step (a) is carried out at a pH in the range of 5 to 8.

14. The method according to claim 6, wherein the oil or fat is selected from the group consisting of butter oil, butter fat, chicken fat, beef fat, sunflower oil, and linseed oil.

15. A method for the preparation of flavours which are rich in $C_6$–$C_{10}$ aldehydes performing the following steps:
 (a) reacting an oil or fat comprising unsaturated fatty acid triglycerides, wherein said oil and said fat are lipase-free, have not been subjected to a lipase treatment and have not been subjected to treatment with an alkali, with a lipoxygenase preparation capable of converting triglycerides into their hydroperoxides in a multiphase system in the presence of air, air enriched with oxygen or oxygen; and
 (b) subsequently thermally converting the obtained mixture, optionally under acidic conditions, resulting in an aldehyde containing product.

* * * * *